United States Patent
Biswas et al.

(10) Patent No.: US 8,031,346 B2
(45) Date of Patent: Oct. 4, 2011

(54) COATING EVALUATION PROCESS

(75) Inventors: Ritwik Biswas, Orlando, FL (US); Ahmed Kamel, Orlando, FL (US); Luiz F. Guimaraes, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 317 days.

(21) Appl. No.: 12/357,586

(22) Filed: Jan. 22, 2009

(65) Prior Publication Data

US 2010/0110451 A1   May 6, 2010

Related U.S. Application Data

(60) Provisional application No. 61/110,115, filed on Oct. 31, 2008.

(51) Int. Cl.
*G01B 11/06* (2006.01)

(52) U.S. Cl. ......................................... 356/631; 356/625

(58) Field of Classification Search .................. 356/426, 356/445, 448, 601–605, 630–631
See application file for complete search history.

(56) References Cited

U.S. PATENT DOCUMENTS

| | | | | |
|---|---|---|---|---|
| 3,837,198 A * | 9/1974 | Higgins | ........................ | 72/18.2 |
| 2004/0246495 A1 * | 12/2004 | Abe | ............................... | 356/603 |

OTHER PUBLICATIONS

Schwenke, Heinrich, et al, "Optical Methods for Dimensional Metrology in Production Engineering".
Beamish, David, "Using Ultra Sonic Coating Thickness Gages", Society of Manufacturing Engineers, Jun. 2004, p. 1-7.
Marks, Peter, Capturing a Competitive Edge Through Digital Shape Sampling & Processing (DSSP), Society of Manufacturing Engineers, 2005, p. 1-29.
Capture 3d Atos Applications Website; 3d Industrial Measurement; www.capture3d.com/atos-applications.html; Oct. 31, 2008.

* cited by examiner

*Primary Examiner* — Tarifur Chowdhury
*Assistant Examiner* — Tara S Pajoohi

(57) ABSTRACT

System and method for evaluating coating thickness variations along a turbine blade contour. In one embodiment, applied to a first region extending 360 degrees about the blade and to a second region including an exposed reference surface, the first region includes a first surface over which the coating is formed and a second surface formed by the coating. The system provides a source of structured light positionable to cast patterns suitable for determination of coordinate position information along the surfaces. One or more imaging cameras are positionable to acquire image data based on the light patterns. A computer system processes image information to (1) characterize the first and second surfaces with respect to a coordinate along the reference surface; (2) compare coordinate data corresponding to the first surface with coordinate data corresponding to the second surface; and (3) determine thickness of the coating as a function of position.

9 Claims, 4 Drawing Sheets

COATING EVALUATION PROCESS

This application claims priority to provisional patent application U.S. 61/110,115 filed 25 Sep. 2008 which is incorporated herein by reference in the entirety.

FIELD OF THE INVENTION

The invention relates to methods for evaluating coating thicknesses as may be used in design and control of manufacturing processes and, more specifically, to monitoring and controlling uniformity in thin coatings of the type used in many machine components.

BACKGROUND OF THE INVENTION

Many types of machinery, particularly but not only rotating machinery, include components which incur high levels of thermal stress and wear that limit the useful life of the component. This necessitates periodic shut down of equipment for inspection, maintenance and repair, often requiring that components be refurbished or replaced. Turbine blades are exemplary. In many instances the blades are multi-layer structures comprising a casting (a base metal alloy) over which various coatings are formed to extend the useful life by modifying the surface properties of the blade. In some instances, as in blade designs for the forward-most stages of steam and gas turbines, because the blades run at higher temperatures than blades positioned in later stages, it is desirable to coat the blades with a high temperature top coating. This top-most coating, often a metal ceramic material, is affixed to the base metal through an intermediate bond coat. Generally such coatings are applied with techniques such as High Velocity Oxi-Fuel (HVOF) spray coating processes or low pressure plasma sprays. The blades positioned in lower temperature stages may also include a coating for enhancing durability. The coating thickness influences life expectancy of the component. Quality and thickness of an intermediate bond coat can affect the integrity of an overlying thermal barrier.

During the manufacture of turbine blades it is very important to assure uniformity and consistency of coating thicknesses throughout the workpiece and among blades having the same design specification. Otherwise a blade may be subject to premature wear-out and spallation. Coating deposition processes must therefore be designed and characterized to assure that tolerance limits are met throughout each coating and that repeatability exists for the provision of uniformity within acceptable limits of variation from blade to blade. It is therefore also important to monitor processes in order to identify and limit process drift. The foregoing has required costly and time intensive monitoring which has only been effected on a limited basis with mechanical and acoustical techniques. Some techniques require destructive testing such as by forming cut-outs through component layers to measure coating thickness in cross section. Ultrasonic probe techniques have also been applied to measure thicknesses and determine variations but these have been based on a limited number of sample measurements along a coating surface. These measurements have been time intensive. Further, acoustical characterizations may at times be subject to relatively large, undesirable measurement errors when the coating is relatively this, e.g., less than 500 microns thick. Moreover, there remains question as to what kind of variation exists between probed points from which data samples are acquired.

Generally it is desirable to develop techniques which enable an increased level of data sampling to characterize variations in coating thicknesses, to characterize coating processes generally, and to monitor the processes so that trends are identified before deviations extend beyond process windows.

BRIEF DESCRIPTION OF THE DRAWINGS

The invention is explained in the following description in view of the drawings wherein.

DETAILED DESCRIPTION OF THE INVENTION

An embodiment of the invention is described in the context of applying a coating to a turbine blade. However, the concepts disclosed herein are more generally applicable to development and characterization of coating processes; monitoring manufacturing processes to limit process drift; and remanufacture or refurbishment of turbine blades or other components for which coatings are replaced. Application of methods according to the invention can result in significant improvements in quality of manufacture and reduction in maintenance and repair of components.

Figure 1:
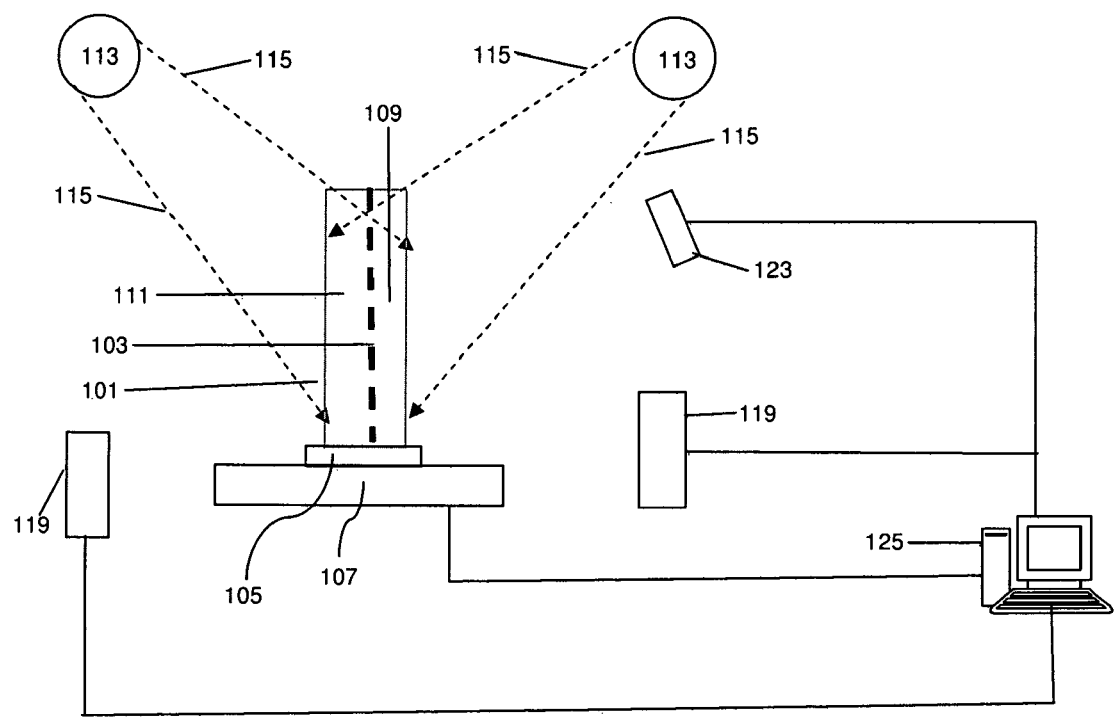
FIG. 1 is a schematic illustration of a system with which methods according to the invention may be practiced.

Development of system control processes in factory-automation applications can be critical to improved reliability, quality, and stability of manufacturing methods. Ideally the monitoring and control processes will have minimal impact on manufacturing cost and will not impede production rates. Use of rapid non-contact sensing in monitoring processes ensures adherence to specific quality process criteria while minimizing cost, human error and disruption or delay in manufacture. FIG. 1 illustrates elements of a system 100 operable in conjunction with a coating deposition process in order to develop, characterize, qualify and monitor the deposition.

Use of structured light in accord with the exemplary methods provides the ability to simultaneously acquire image information from an entire surface in a field of view to provide calibrated measurement of surface coordinates. The system 100 includes a projection unit and at least two cameras. The configuration of the projection unit, light sources and spacings relative to cameras determines a volume of space to be scanned commensurate with the size of the object being examined. Providers of components, software and services suitable for the system 100 and practicing methods according to the invention include GOM International AG Bremgarterstrasse 89B CH-8967 Widen Switzerland, which provides systems for industrial measurement including the ATOS System, and Capture 3D, Incorporated 3505 Cadillac Avenue Suite F-1 Costa Mesa, Calif. 92626 which provides dimensional inspection and characterization solutions based on optical measurement of fringe patterns using triangulation techniques. When based on the ATOS system from GOM International AG, the system 100 can be optimally configured for precision measurement of small features and is suited for measurements requiring high levels of accuracy and large quantities of data. For example, the system can scan a measured volume in 550 mm length by 550 mm in depth by a height of 100-500 micrometers. In such a configuration, the system 100 can acquire four million data points in 8 seconds at 250 micrometers lateral resolution with 3-7 micrometers noise error.

According to an embodiment of the invention, the work piece receiving a coating layer is scanned while placed on a turntable that rotates at a predefined rate through a field of view illuminated by structured light. Incorporation of such rotation provides improved quality of measurement by eliminating the systematic noise which can result from physically moving the work piece, e.g., with a manipulator such as a robotic arm. However, robotic movement of the work piece relative to the cameras and light sources is a viable approach for collecting image information over a 360 degree field with structured light.

A work piece 101 having a central axis 103 is shown mounted on a rotating turntable 107. The work piece includes a base region surface 105 which, when the work piece is a turbine blade, may correspond to a blade root. Generally, for many embodiments of the invention, part or all of the surface 105 does not receive a coating layer.

Data acquisition is effected with structured light cast upon the work piece 101. With the work piece mounted on the turntable 107, rotation about the axis 103 enables use of stationary components to perform characterization of an exposed surface 109 of a region 111 extending 360 degrees around the work piece 101.

The work piece 101 may be any article of manufacture on which a coating is formed. It may be a blade or other component retrieved from a turbine undergoing refurbishment or may be any newly fabricated component undergoing a coating process. Suitable coating processes include many well-known types of physical or chemical process including but not limited to HVOF spray coating processes, plasma processes, electro deposition and electroless deposition processes. If the work piece is a turbine blade or other component which is being refurbished, one or more pre-existing coatings may be removed from the work piece by conventional means such as application of abrasive media or chemical etching.

The system 100 includes multiple structured white light sources 113 positioned about the turntable 107 to illuminate the work piece with white light as indicated by a series of rays 115. As more fully described herein, the white light casts structured light patterns along the exposed surface 109 of the work piece. Other types of light, including laser radiation may be used.

Two exemplary imaging cameras 119 are positioned in spaced-apart relation to one another and about the work piece to each provide a different view of the structured light patterns generated on the exposed surface 109 of the work piece 101. The cameras 119 generate image data based on the light patterns formed on the exposed surface 109. An infra-red camera 123 is positioned to monitor the surface temperature of the work piece. The exemplary imaging cameras are responsive to the white (visible) light sources but other embodiments may include camera systems having imaging capability in other wave length bands including but not limited to the infrared portion of the spectrum.

A central computer system 125 controls the entire system 100, records data from the imaging cameras 119 and the infrared camera 123, computes temperatures along the surface 109 as a function of time. The computer system also performs calculations based on image data to generate a point cloud defining the exposed surface 109 in a spatial coordinate system.

The image data is derived from projection of a light pattern (e.g., a grid, or more complex shape) at a known angle on the exposed surface 109 of the work piece 101. The data is used to calculate coordinate information which spatially defines the surface 109 in a coordinate system. The light pattern may be a fringe pattern, i.e., a series or an array of alternating light and dark bands or spots resulting from diffraction or interference of the light along the surface of interest.

Such an array of fringes can be generated by fanning out a light beam into a sheet-of-light with the use of diffractive or refractive optics. When the sheet-of-light impinges upon a surface, a series of bright lines or spots can be seen on the surface of the object. Such structured light, e.g., generated with a laser or with white light, can be projected in precise geometric patterns (lines, grids, matrices of dots) and used for performing three dimensional machine vision tasks. Generally, by viewing structured light patterns from an angle, the patterns can be translated into coordinate position data such that a point cloud, i.e., a series of point data, can be generated.

When applied according to embodiments of the invention structured light provides a basis to capture image data from two different exposed surfaces 109, e.g., 109*a* and 109*b*, with two-dimensional imaging arrays from which surface coordinate data along the exposed surfaces of the work piece 101 are generated. In the system 100 each point is defined in a three dimensional space, e.g., with an X, Y, Z Cartesian system, and corresponds to a point along one of the exposed surfaces. Collection and processing of image data from the workpiece before and after formation of a coating enables determination of coating thickness as a function of position along the work piece.

Data acquisition with structured light can be applied in this context to align or register two or more data sets for comparison in a common coordinate system. According to embodiments of the invention, each set of data points may represent a different physical surface along a region of the work piece 101. By way of example, data from one set can represent a first exposed surface contour 109*a* along the region 111 of the work piece before a coating is applied, while data from a second set can represent a second exposed surface contour 109*b* along the same region 111 of the work piece after the coating is applied. With rotation of the workpiece about the axis 103, each data set can comprehend a region extending 360 degrees about the work piece 101. Data from the different sets are selectively combined to form pairs of data points. Points in each pair provide representations of a location on a surface, e.g., surface 109*a*, and a position directly above the location such that the points in each pair bound the volume in which the coating is formed. The distance between points in each pair corresponds to a local thickness measurement of the applied coating.

Figure 2:
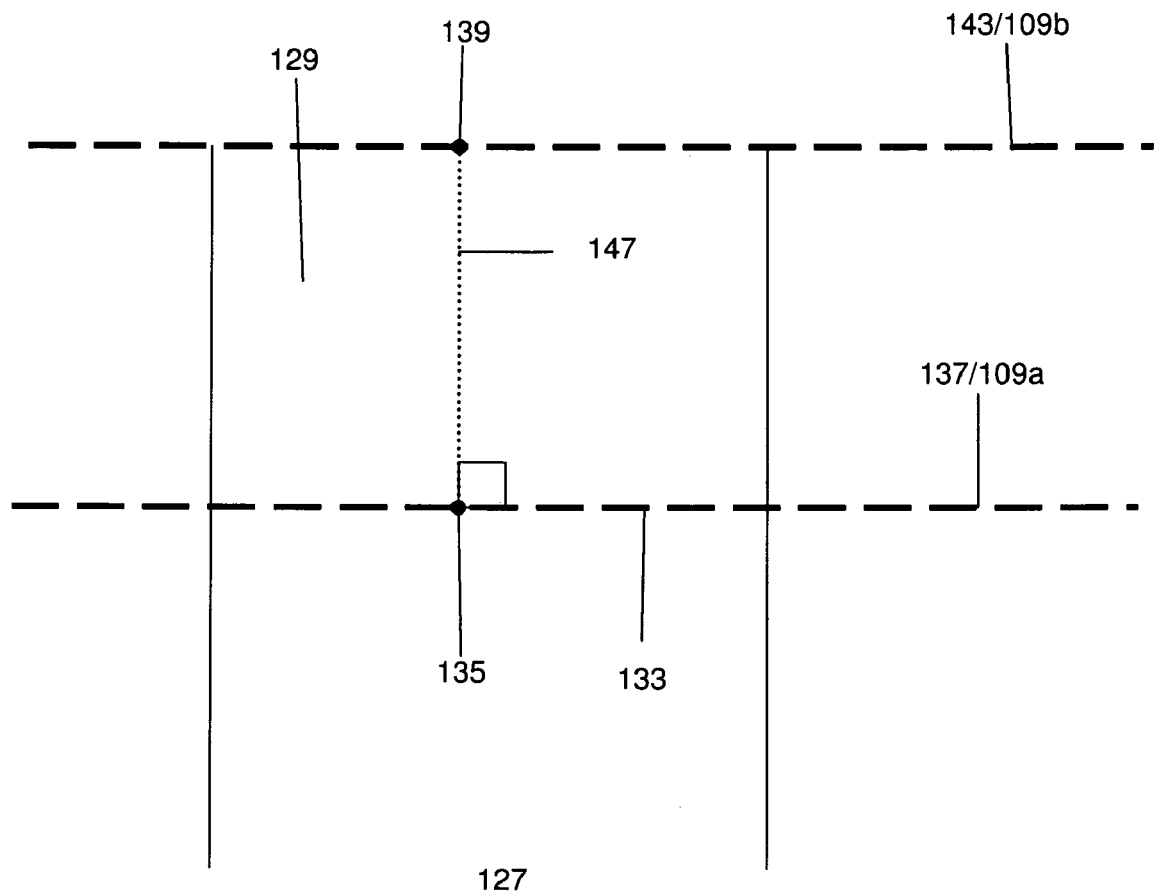
FIG. 2 is a cross sectional view of a work piece illustrating relationships among data points according to an embodiment of the invention.

FIG. 2 is a partial cross sectional view of an arbitrary portion 127 of the region of the work piece 101 being characterized. A coating layer 129 is shown formed over a portion 133 of the first exposed surface 109*a*. Collection of image data from the first exposed surface 109*a* occurs before the coating layer 129 is formed over the first exposed surface 109*a*. A first data point 135 is positioned on the now-covered first surface 137 (corresponding to the first exposed surface 109*a*) and a second data point 139 is positioned on a second surface 143 (corresponding to the second exposed surface 109*b*). Phantom lines are shown indicating portions of the surfaces 137/109*a* and 143/109*b* extending beyond the portion 127 of the work piece 101. The second data point 139 is selected as a point directly above the first data point 135 as indicated by a line 147 extending in an orthogonal direction from the surface portion 133 and between the pair of data points (135, 139).

With the points so grouped in pairs, distances between points in each pair are calculated to determine the thickness of the coating at each pair of points. Variations in thickness can then be determined as a function of position along either surface of the workpiece. The relative thickness of the coating is calculated relative to a series of surface portions 133 which are each substantially normal to the direction along which each thickness determination is made. This is indicated by the example in FIG. 2 wherein an orthogonal relation exists between the exemplary line 147 and the surface portion 133. The data sets used to generate the thickness information may consist exclusively of measured data that provides sufficient resolution to assess variations in coating thickness along the workpiece surface. However, to reduce potential error due to misalignment of points in pairs, e.g., relative to a line 147 which is orthogonal to a work piece surface portion 133, it may be necessary to generate additional point data by, for example, interpolations, to generate points along the surface 109b which are closer to or coincident with an associated line 147 that is normal to the work piece surface.

Structured light scanning provides the ability to rapidly capture sufficient data to completely define the physical surface of the entire blade at an arbitrary level of precision. While the number of data points may vary, e.g., from the thousands to the tens of millions, the accuracy of each thickness measurement is not affected by the number of samples in each data set. Increasing the number of samples provides a more comprehensive assessment of thickness variations along the region 111. Greater accuracies are achievable by, for example, using laser-based triangulation techniques which can more precisely determine position information.

For ease of data acquisition and analysis, the work piece may have alignment marks. Illustratively, with the work piece being a rotor blade, the mounting positions (i.e., machined mounting holes, could be used as the alignment marks. Similarly, vestiges from casting are suitable reference points. Once the post-processing scan is completed it can be overlaid on the pre-processing scan image based on the alignment of the marks. Then changes in surface distances normal to the direction of incidence of the probing structured light are calculated from changes in interference patterns.

As the work piece 101 expands or contracts during temperature cycling, changes in the coating thickness can be observed. Use of the IR camera 123 may be especially advantageous during process development and for work piece characterization to determine, for example, the influence of temperature on the behavior of the coating layer 129 after the work piece 101 is removed from the coating furnace. If a portion of the layer 129 is found to be relatively thin at ambient temperature, data taken at one or more higher temperatures can be analyzed to determine the thickness prior to cooling. By capturing both image data, based on structured light, and infrared data, corresponding to temperature along the work piece surface, spatial and temporal differences in rates and magnitudes of change in layer thickness can be monitored while the coating layer 129 cools from a deposition temperature. This enables understanding of deformations in the coating layer as a function of position along the surface as the surface cools. Any deformations in the exposed surface 143 of the coating layer 129 can be monitored relative to the pre-characterized underlying first surface 137 on which the coating layer 129 is formed.

Figure 3:
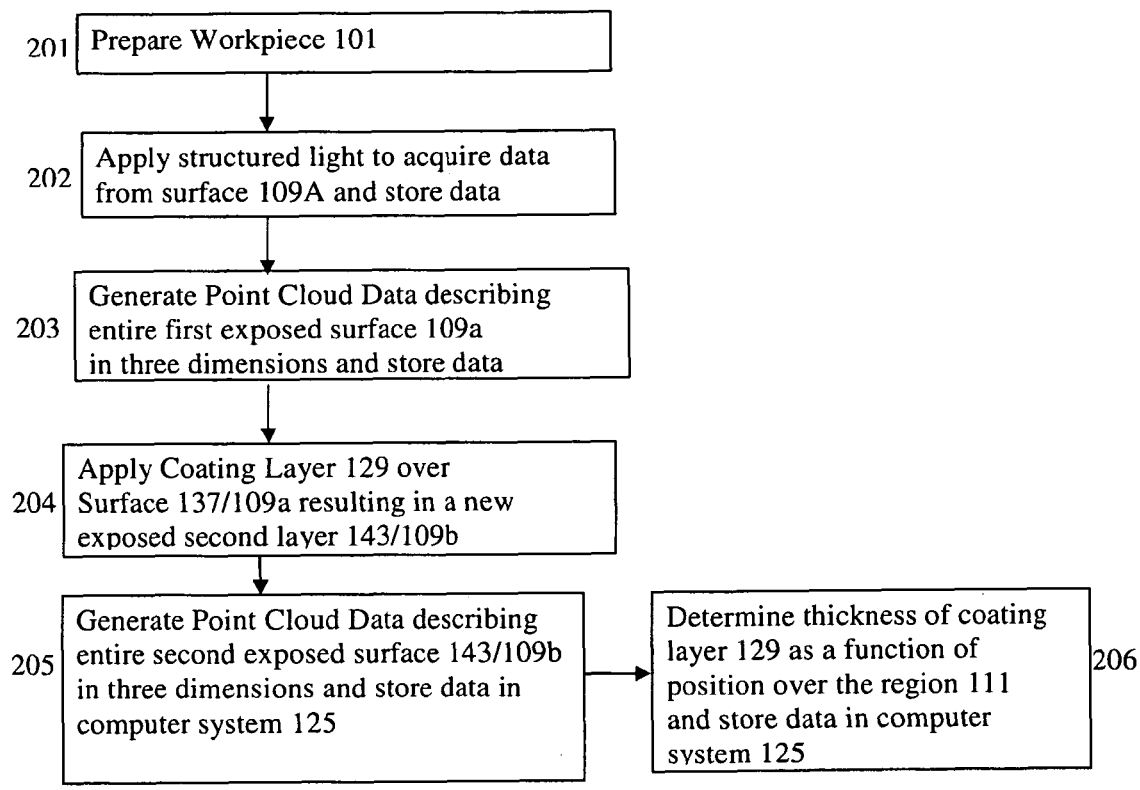
FIG. 3 is a flow chart describing features of an exemplary method according to the invention.

FIG. 3 is a flow chart illustrating an exemplary series of steps in a coating deposition process incorporating the system 100 of FIG. 1 to determine both the thickness and the thickness variation of a coating layer along the surface of a work piece. As indicated in step 201, the work piece 101 is prepared for receiving a coating with, for example, a HVOF thermal spray process. Next, structured light is applied to the exposed surface 109a of the work piece to generate a pattern and capture an image of the pattern. See step 202. The turntable 107 may rotate continuously while the cameras continuously capture image data, or the turntable may rotate the work piece 101 incrementally such that the cameras acquire data from a series of positions, e.g., at sixty degree intervals of rotation. Image data is also acquired from portions of or from all of the base region surface 105. In the example sequence the computer system immediately generates point cloud data (step 203) based on the captured image data which describes the entire surface 109a in a three dimensional coordinate system. The point cloud data includes information descriptive of the base region surface 105 of the work piece 101 which surface does not receive the coating layer 129. The coordinate system used to describe the surface 109a is defined, in part, by structured light patterns formed along part or all of the base region surface 105.

Next, as described in step 204, the coating layer 129 is applied to the exposed surface 109a, e.g., by conventional means including placement of the work piece in a coating furnace. Per step 205, after removal of the work piece 101 from the furnace, one or a time series of characterizations are performed. In each characterization structured light is applied as described with respect to step 202 but with the light generating the pattern along the second surface 143 and the cameras 119 capturing image data therefrom. As in step 202, the turntable 107 may rotate continuously while the cameras continuously capture image data, or the turntable may rotate the work piece 101 incrementally such that the cameras acquire data from a series of positions, e.g., at sixty degree intervals of rotation. Image data is also acquired from portions of or from all of the base region surface 105 as in Step 202. This image information corresponds to substantially the same or identical surface information as acquired in Step 202 and enables establishment of essentially the same coordinate system as in Step 202, or registration of the two coordinate systems defined in steps 202 and 205.

Based on data acquired in Step 205 the computer system 125 may immediately generate point cloud data (step 206) based on the captured image data for an entire series of characterizations as a function of temperature, or may generate point cloud data for one characterization corresponding to a time when the work piece 101 has cooled to the same ambient temperature at which characterization has been performed in Step 202. The one point cloud data set or each point cloud data set generated in Step 205 describes the entire surface 109b in a three dimensional coordinate system at a defined temperature. The point cloud data sets each include information descriptive of the base region surface 105 of the work piece 101 at least a portion of which surface has not received the coating layer 129. The coordinate system is defined, in part, by structured light patterns formed along part or all of the base region surface 105 which has not been covered with the layer 129. This enables registration of all point cloud data sets generated in Steps 202 and 205 in order to perform computations of coating layer thickness as a function of position along the region 111. Data points generated directly from the structured light patterns may be spaced on the order of 250 microns apart and measurements of coating thicknesses, ranging from 150-450 microns, may be subject to measurement noise on the order of 3-7 microns.

According to Step 206, the computer system 125 processes the point cloud information from the data set calculated in step 202 and one or more of the point cloud data sets calculated in step 205. Additional points may be generated over the second surface 143 to reduce error in calculation of layer thickness.

Figure 4:
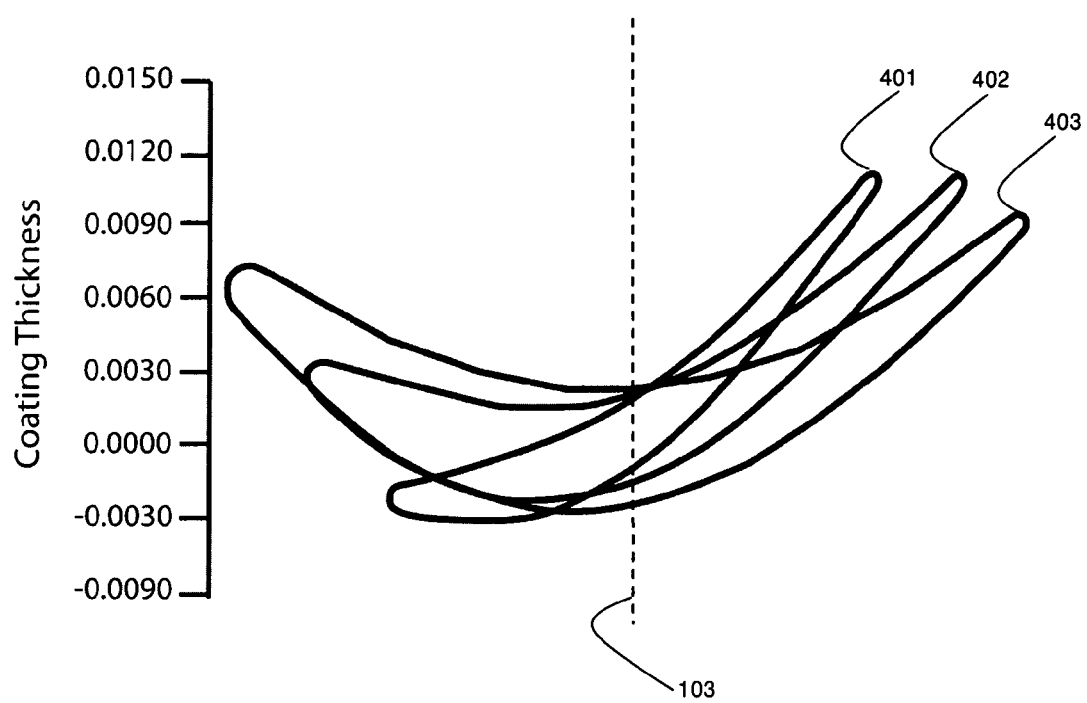
FIG. 4 illustrates measured coating thickness along a series of bands which each correspond to a cross section taken through a turbine blade according to the invention.

Embodiments of the invention afford a number of advantages including, but not limited to, the ability to non destructively measure coating thickness over the entire surface of a work piece including in high curvature areas such as fillets. See, for example, FIG. 4 which illustrates coating thickness data along arbitrary bands 401, 402 and 403 extending about the workpiece 101. Each band corresponds to a different cross section taken through the work piece. The scale indicates the measured variation in coating thickness along each band.

The system as described is useful for measuring numerous coating types including, metallic and ceramic coatings, as well as other composites. The system is easily automated and is also able to effect efficient collection and analysis of very large volumes of data. These advantages make it possible to deploy the method in manufacturing steps on a real-time basis.

Other advantages of the method described include determining of the effects of individual coating unit process steps such as grit blasting, the impact of thermal exposure on part distortion, and the development of standards for gauge capability studies of various ih-house metrology systems. A coating monitoring process has been described which is based on imaging of structured light. While various embodiments of the present invention have been described, these are provided by way of example only. Numerous variations, changes and substitutions may be made without departing from the invention herein. Accordingly, it is intended that the invention be limited only by the spirit and scope of the claims which follow.

The invention claimed is:

1. A method for evaluating variations in thickness of a coating formed along a contour on a turbine blade, the blade being of a type having a first region extending over a range of 360 degrees about the blade and a second region including an exposed reference surface, the first region including a first surface over which the coating is formed and a second surface formed by the coating, the method comprising:

prior to forming the coating over the blade and with the first surface visibly exposed, forming a first set of optical patterns thereover;

performing non-scanning optical imaging to acquire a first set of point cloud data based on the first set of optical patterns and representative of the first surface along the first region relative to an exposed reference point along the reference surface, the first set of data including coordinates characterizing spatial attributes of the first exposed surface;

forming the coating over the first region to cover the first surface and provide a second exposed surface while leaving the reference point exposed;

after forming the coating over the first region, forming a second set of optical patterns thereover;

performing non-scanning optical imaging to acquire a second set of point cloud data based on the second set of optical patterns and representative of the second surface along the first region relative to the exposed reference point, the second set of data including coordinates characterizing spatial attributes of the second exposed surface; and calculating a set of values indicative of thickness variations in the coating based on differences between data values in the first and second sets of point cloud data.

2. The method of claim 1 wherein the steps of forming the first and second sets of optical patterns are performed by rotating the blade so that the patterns are formed over the 360 degree range, and the first and second sets of point cloud data are acquired about the 360 range of the first surface by rotating the blade.

3. The method of claim 1 wherein the steps of forming the first and second optical patterns are performed by projecting fringe patterns on to the first and second regions and recording images of the patterns with a camera.

4. The method of claim 1 wherein the steps of acquiring the first and second sets of point cloud data each include calculating three dimensional coordinates for at least one million points along the first region.

5. The method of claim 1 wherein the first and second sets of point cloud data each include x, y and z data of a Cartesian coordinate system for each in a plurality of points.

6. The method of claim 1 further including acquiring infrared energy from the second surface to determine temperature of the second surface when performing the optical imaging.

7. A system for evaluating variations in thickness of a coating formed along a contour on a turbine blade, the blade being of a type having a first region extending over a range of 360 degrees about the blade and a second region including an exposed reference surface, the first region including a first surface over which the coating is formed and a second surface formed by the coating, the system comprising:

one or more sources of structured light positioned to cast patterns over exposed surfaces of the turbine blade, the patterns suitable for determination of coordinate position information along the surfaces;

one or more imaging cameras (119) positioned to acquire image data based on the light patterns as formed along the exposed surfaces;

a computer system 125 configured to receive and process information from the cameras in order to (1) generate coordinate data characterizing the first and second surfaces with respect to a coordinate along the reference surface; (2) compare coordinate data corresponding to the first surface with coordinate data corresponding to the second surface; and (3) determine thickness of the coating as a function of position along the blade.

8. The system of claim 7 further including an infra-red camera (123) is positioned to provide data to the computer system to monitor temperature along one or more of the surfaces while acquiring image data with the one or more cameras.

9. The system of claim 7 wherein the sources of structured light are sources of white light positioned to cast a fringe pattern upon the work piece.

* * * * *